(12) United States Patent
Mercier

(10) Patent No.: US 6,471,450 B1
(45) Date of Patent: Oct. 29, 2002

(54) COUNTERSINK CAGE

(75) Inventor: Jeffrey Garrett Mercier, Long Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/883,759

(22) Filed: Jun. 18, 2001

(51) Int. Cl.[7] .......................... B23B 35/00; B23B 51/00
(52) U.S. Cl. .......................... 408/1 R; 408/82; 408/202
(58) Field of Search .......................... 408/72 R, 72 B, 408/1 R, 80–82, 113, 202, 241 S, 14

(56) References Cited

U.S. PATENT DOCUMENTS

| | | | |
|---|---|---|---|
| 2,192,528 A | 3/1940 | Schmidt | |
| 2,216,988 A | 10/1940 | Schmidt | |
| 2,223,485 A | 12/1940 | Eveleth | |
| 2,359,309 A | * 10/1944 | Hayes | .......................... 408/113 |
| 2,359,859 A | 10/1944 | Jarvis | |
| 2,383,854 A | 8/1945 | Gwinn, Jr. | |
| 2,422,279 A | 6/1947 | Zimmer | |
| 2,477,891 A | 8/1949 | O'Neill | |
| 2,522,330 A | 9/1950 | Wright | |
| 2,529,988 A | 11/1950 | Zempel | |
| 3,381,551 A | * 5/1968 | Lavering et al. | .......... 408/72 R |
| 4,115,017 A | * 9/1978 | Wilhelmsson | ................ 408/14 |
| 5,066,172 A | * 11/1991 | Swim, Jr. | ................... 408/1 R |
| 5,882,151 A | 3/1999 | Wirth, Jr. et al. | |

* cited by examiner

Primary Examiner—Steven C. Bishop
(74) Attorney, Agent, or Firm—Stetina Brunda Garred & Brucker

(57) ABSTRACT

A countersink cage for controlling a rotating countersink cutter to penetrate to a predetermined depth through a curved surface along a cutting axis. More specifically, the countersink cage comprises a top cage member with a top aperture which is formed for receiving the rotating countersink cutter axially therethrough. Rotatably attached to the top cage member is a bottom cage member. The bottom cage member has a bottom aperture aligning itself with the top aperture for receiving the rotating countersink cutter axially therethrough. Further, two contact members extend from the bottom cage member. The two contact members are sized and configured to contact the curved surface when the countersink cutter penetrates therethrough along the cutting axis to the predetermined depth.

32 Claims, 3 Drawing Sheets

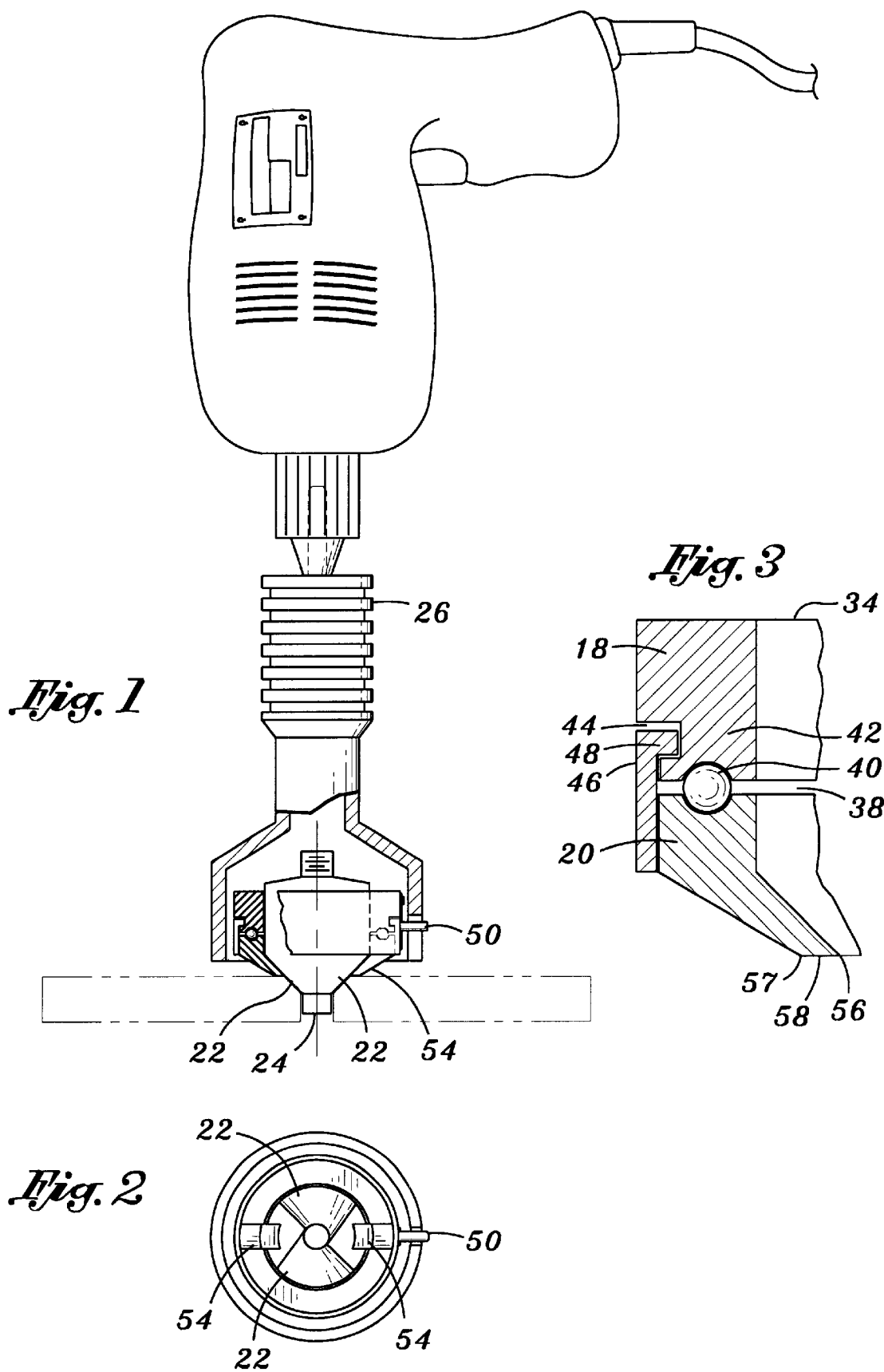

COUNTERSINK CAGE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to countersink cages, and more particularly to an improved countersink cage with two extending contact members that are specifically sized and configured to contact a curved surface when an attached countersink cutter penetrates therethrough to a predetermined depth.

Countersink cages are well known throughout the aerospace industry as well as other industries. Indeed, various types of countersink cages are currently available and in wide use. Countersink cages are useful in facilitating and expediting precision drilling and countersinking by predetermining the depth in which a countersink cutter and a drill tool may collectively penetrate a given work surface. In order to achieve such purpose, a typical countersink cage is secured to the drill and countersink device at a selected location (e.g., a spindle) so as to align itself along the countersink cutter supporting the drill tool therein. In this regard, the countersink cage predetermines the limits of depth in which the countersink cutter and the drill tool can collectively penetrate the work surface. Simply put, when the predetermined depth is reached, the countersink cage contacts the work surface to prevent any further penetration.

However, though such currently known and available countersink cages may accomplish their primary objective of precision drilling and countersinking, they possess certain deficiencies which detract from their overall utility. Perhaps the greatest deficiency of the prior art countersink cages is the inability to conduct precise drilling and countersinking operations upon curved surfaces, such as concave or convex curved surfaces for example.

More specifically, the prior art countersink cages are mainly utilized for depth control and alignment purposes on flat surfaces. However, the depth control must typically be continually adjusted as the contour of the surfaces change, thus making the drilling and countersinking operations vulnerable to its operators' skills and ability. Moreover, even the alignment relative to the curved surfaces is compromised in that the countersink cages are often incapable of being stabilized evenly thereon. Simply put, the prior art countersink cages not only tend to increase the possibility of performing defective drilling and countersinking operations, but they also tend to mitigate user-convenience and labor time.

Thus, there has long been a need in the industry, and in the aerospace industry in particular, for a countersink cage capable of maintaining the same depth on all surfaces without the need for any manual adjustment. In particular, there is a need for a countersink cage which can stabilize itself evenly on all surfaces, whether they are flat or curved.

The present invention addresses and overcomes the above-described deficiencies of prior art countersink cages by providing two extending contact members that are specifically sized and configured to evenly contact convex and/or concave curved surfaces when the countersink cutter penetrates therethrough to a predetermined depth. Moreover, the present countersink cage is directly and selectively engageable to the countersink cutter so as to facilitate consistent depth-penetration on such curved surfaces. In this respect, not only does the present countersink cage mitigate operator-dependency and labor time, but it also tends to ensure precision drilling and countersinking operations on all surfaces of different contours.

BRIEF SUMMARY OF THE INVENTION

In accordance with a preferred embodiment of the present invention, there is provided a countersink cage for controlling a countersink cutter to penetrate to a predetermined depth through a curved surface. The countersink cutter has a cutter body which may attach a drill tool thereto. Furthermore, the cutter body has a device end and a cutting end. The device end is adapted to be engaged to a drill and countersink device in order to rotate the cutter body thereby. Moreover, the cutting end is operative to penetrate through the curved surface along a cutting axis to the predetermined depth.

The countersink cage of the preferred embodiment comprises a top cage member having a top aperture formed for receiving the rotating cutter body axially therethrough. The top cage member is selectively engageable to the countersink cutter along the rotating cutter body, namely, between the device and cutting ends thereof. Rotatably engaged with the top cage member is a bottom cage member. The bottom cage member has a bottom aperture aligning itself with the top aperture to also receive the rotating cutter body axially therethrough. In addition, two contact members extend from the bottom cage member. The two contact members are sized and configured to contact the curved surface when the rotating cutter body penetrates therethrough to the predetermined depth. The top cage member, bottom cage member and two contact members are each preferably fabricated from a metallic material.

The countersink cage may be adjusted along the rotating cutter body so as to facilitate in penetrating the curved surface to the predetermined depth. More particularly, a set block having a pin mounted thereon should be obtained to serve such purpose. The countersink cage is positionable on the pin through the aperture. The rotating cutter body is then partially pushed through the aperture with the pin. The countersink cage is removed from the set block to engage the drill tool/pilot to the rotating cutter body. The pushed portion of the rotating cutter body and the drill tool extending therefrom are representative of the predetermined depth to be penetrated through the curved surface.

In the preferred embodiment, the top cage member and the bottom cage member collectively form a raceway therebetween. The raceway may have a plurality of bearing balls for facilitating the rotational engagement between the top and bottom cage members. Further to such configuration, the top cage member has a lower top cage member portion peripherally defining a groove. Additionally, the bottom cage member has an upper bottom cage member end peripherally defining an appendage extending generally perpendicular toward the rotating cutter body. The groove is complimentary to the appendage so as to be engageable with each other. However, a dowel pin may extend between the bottom cage member and a fixed location of the drill and countersink device. In this respect, the dowel pin maintains the bottom cage member in a stationary position as the top cage member is rotatable with respect thereto.

Moreover, the bottom cage member has a lower bottom cage member end in which the two contact members are formed thereto. In the preferred embodiment, the two contact members are two directly opposed, symmetrically formed annular segments. The two annular segments each comprise a bottom surface having a lower inner edge. Specifically, the lower inner edge is disposed adjacent the rotating cutter body for supporting the countersink cage upon a convex curved surface when the rotating cutter body penetrates therethrough. The lower outer edge is disposed generally opposite to the lower inner edge away from the rotating cutter body.

BRIEF DESCRIPTION OF THE DRAWINGS

These as well as other features of the present invention will become more apparent upon reference to the drawings wherein:

FIG. 1 is a side view of a countersink cage constructed in accordance with the present invention as engaged to a drill and countersink device;

FIG. 2 is a bottom view of a bottom cage member of the countersink cage shown in FIG. 1, and including two contact members extending therefrom;

FIG. 3 is a cross-sectional view of the countersink cage shown in FIG. 1, illustrating the manner in which its top and bottom cage members are rotationally engaged to each other via bearing balls disposed in a raceway formed therebetween;

DETAILED DESCRIPTION OF THE INVENTION

Figure 4:
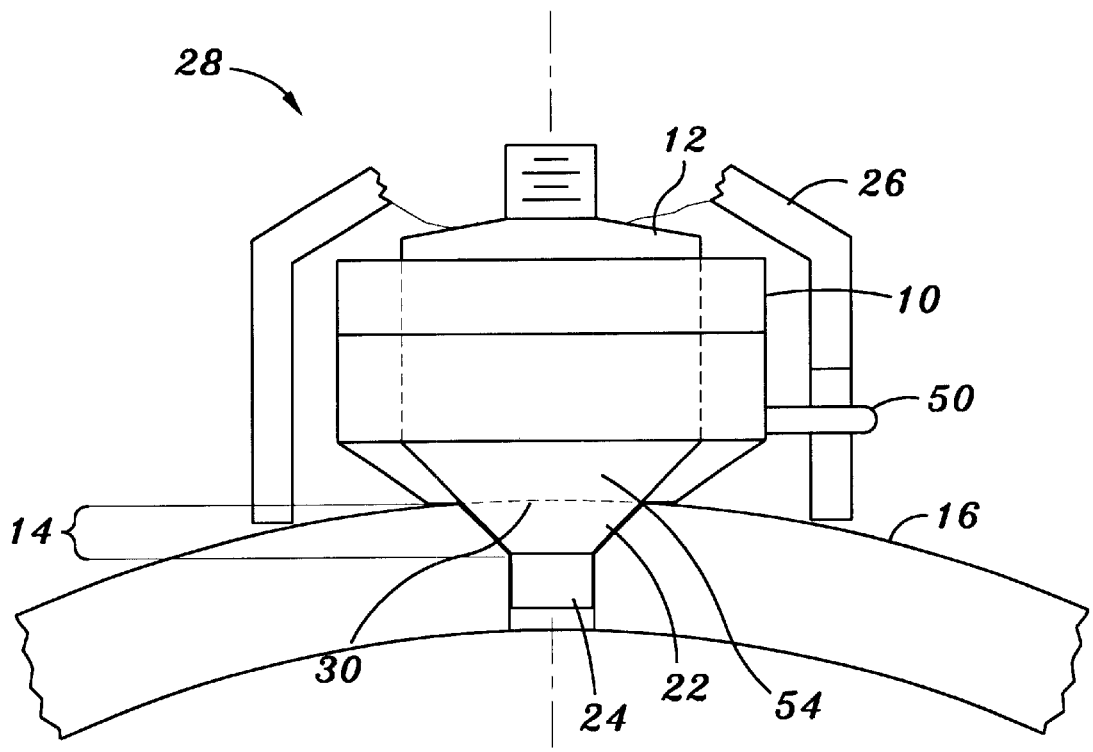
FIG. 4 is an exploded front view of the two contact members shown in FIG. 2 supporting the countersink cage upon a convex curved surface via its lower inner edges.
Figure 5:
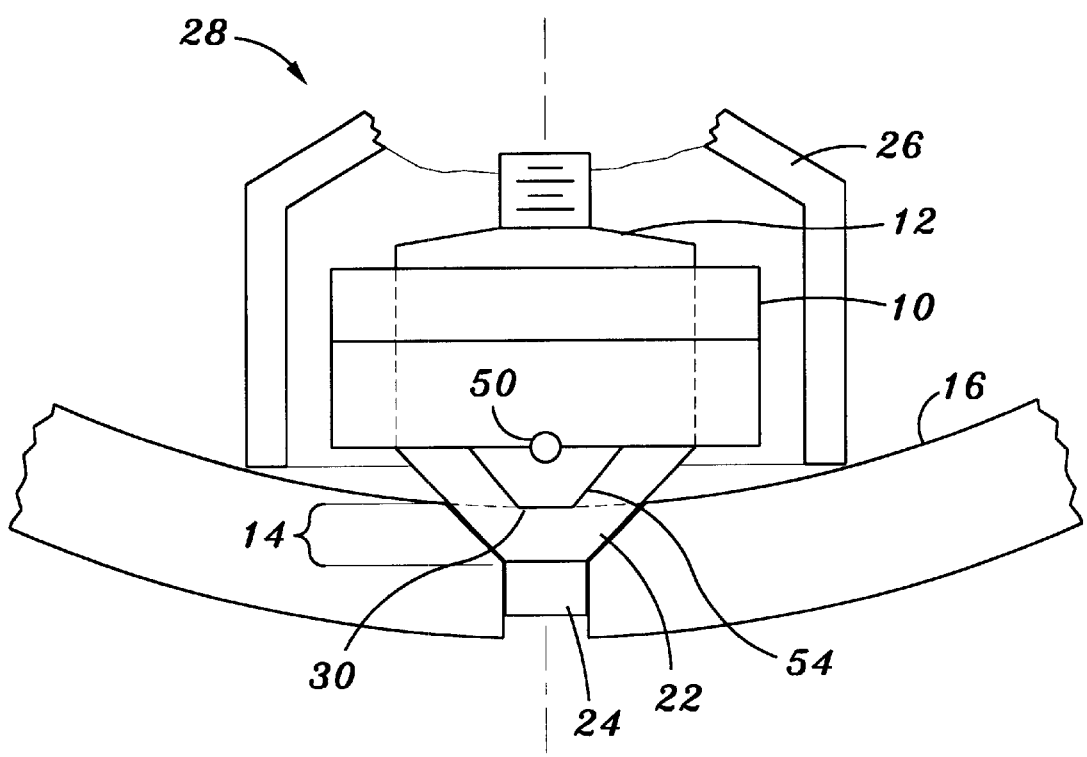
FIG. 5 is an exploded front view of the two contact members shown in FIG. 2 supporting the countersink cage upon a concave curved surface via its bottom surface.
Figure 6A:
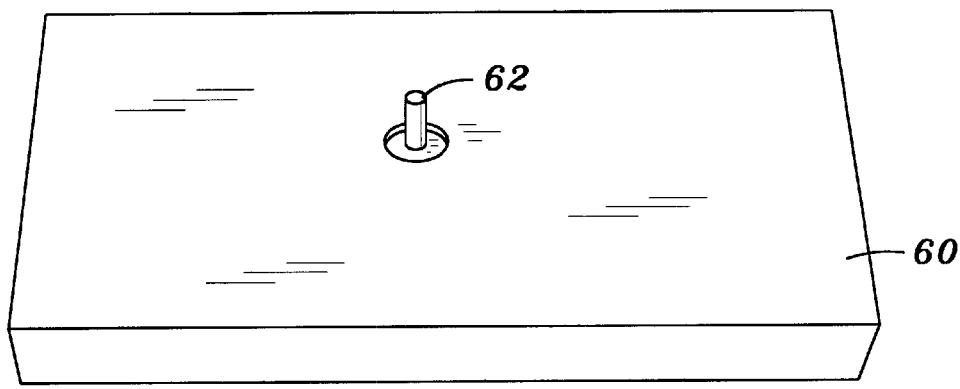
FIGS. 6A–6C illustrate a set block with an adjusting pin mounted thereon utilized to adjust the countersink cage shown in FIG. 1 along a rotating cutter body.
Figure 6B:
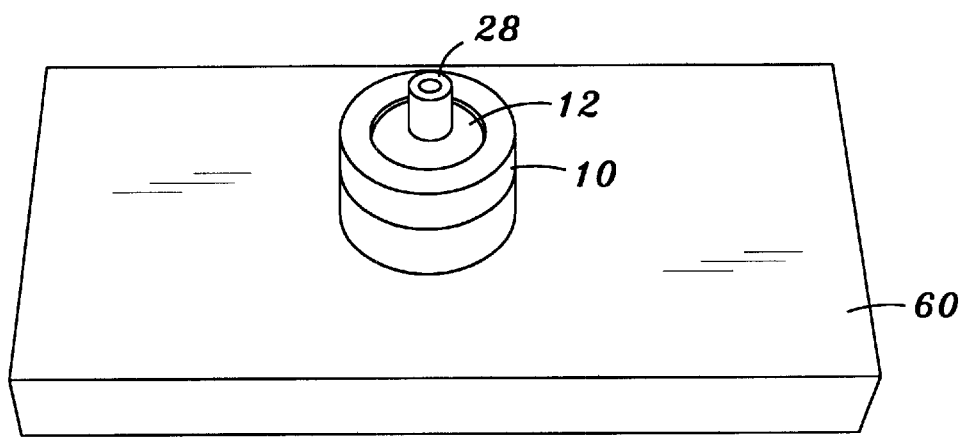
Figure 6C:
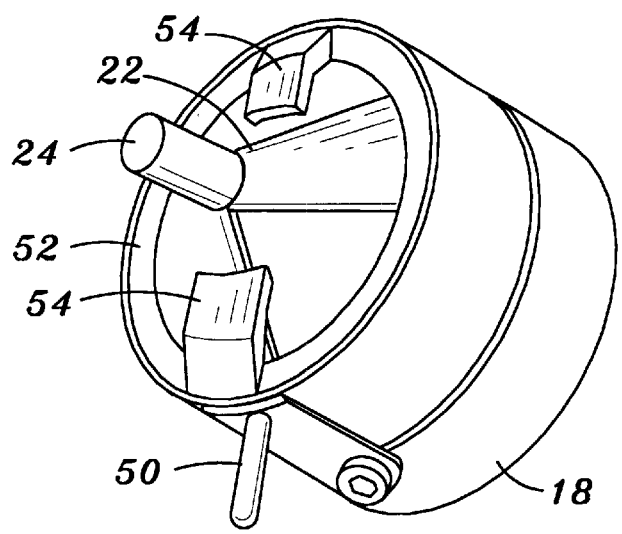

Referring now to the drawings wherein the showings are for purpose of illustrating preferred embodiments of the present invention only, and not for purposes of limiting the same, FIG. 1 is a side view of a countersink cage 10 constructed in accordance with the present invention. As indicated above, the countersink cage 10 is adapted to control a countersink cutter 12 to penetrate to a predetermined depth 14 and diameter 15 through a curved surface 16, such as in the manner shown in FIGS. 4 and 6. Those of ordinary skill in the art will recognize that the countersink cage 10 may be formed to have a variety of shapes, configurations, geometries, sizes and textures other than that shown in FIGS. 1–6.

Referring more particularly to FIGS. 1–3, the countersink cage 10 comprises a top cage member 18 and a bottom cage member 20. The top cage member 18 may selectively engage the countersink cutter 12 along its cutter body 22. As the countersink cage 10 is engageable to the cutter body 22, the cutter body 22 is engageable to a drill and countersink device 26. More specifically, the cutter body 22 has a device end 28 and a cutting end 30. The device end 28 is configured to be rotatably attached to the drill and countersink device 26, namely, its chuck, in order to rotate the cutter body 22 thereby. In this respect, as the cutter body 22 is rotated, its cutting end 30 is operative to penetrate through the curved surface 16 along a cutting axis 32 to the predetermined depth 14, as the manner in doing so will be discussed below. Moreover, the cutting axis 32 is defined to be the axis of linear motion of the countersink cutter 12 with respect to the curved surface 16 when conducting drilling and countersinking operations.

The top cage member 18 includes a top aperture 34, whereas the bottom cage member 20 also has a bottom aperture 36. The top and bottom apertures 34, 36 are aligned with each other so as to receive the cutter body 22 axially therethrough. Thereafter, as discussed above, the top cage member 18 is then selectively engaged to the cutter body 22, namely, at any longitudinal position between the device and cutting ends 28, 30 thereof. The top cage member 18 and the bottom cage member 20 are each preferably fabricated from a metallic material.

Referring now to FIGS. 2 and 3, the top cage member 18 and the bottom cage member 20 are rotatably engaged to each other. One manner of rotationally engaging the two may be by forming a raceway 38 having a plurality of bearing balls 40 therebetween. In particular, the top cage member 18 and the bottom cage member 20 may collectively form a raceway 38 therebetween. Such raceway 38 should be sized and configured to accommodate a plurality of bearing balls 40 for facilitating rotation of the top cage member 18 and the bottom cage member 20 in relation to one another. For example, the raceway 38 may support the bearing balls 40 by forming respective and corresponding indentations on the top cage member 18 and the bottom cage member 20 specifically adapted to support and locate the bearing balls 40 thereby (best shown in FIG. 3). Moreover, one of ordinary skill in the art may contemplate alternative bearing arrangements, such as a bearing set with races and balls formed as a unit.

By forming such configuration and relationship, the bearing balls 40 may be sustained at the raceway 38 by the engagement of the top cage member 18 and the bottom cage member 20 to each other. In the preferred embodiment, the top cage member 18 comprises a lower top cage member portion 42 which peripherally defines a groove 44. Additionally, the bottom cage member 20 has an upper bottom cage member end 46 peripherally defining an appendage 48 extending generally perpendicular toward the rotating cutter body 22 when the top cage member 18 is attached thereto. The groove 44 is complimentary to the appendage 48 so as to be sized and configured to engage with each other. However, it is preferred that the bottom cage member 20 is stationary when the drilling and countersinking operations occur so as to mitigate any compromise to its precision and accuracy, as well as to prevent potential marring of the curved surface 16. One way of maintaining the bottom cage member 20 stationary is to extend a dowel pin 50 between the bottom cage member 20 and a fixed location of the drill and countersink device 26. The dowel pin 50 preferably forms a generally perpendicular relationship to the length of the cutter body 22 when extended between the bottom cage member 20 and the fixed location of the drill and countersink device 26. As such, the bottom cage member 20 is maintained in a stationary position as the top cage member 18 is rotatable with respect thereto.

Moreover, the bottom cage member 20 has a lower bottom cage member end 52. Extending from the lower bottom cage member end 52 are two contact members 54 sized and configured to contact the curved surface 16 when the rotating cutter body 22 penetrates therethrough to the predetermined depth 14. The two contact members 54 are preferably fabricated from a metallic material. Furthermore, in the preferred embodiment of the present invention, the two contact members 54 are two annular segments that are symmetrically formed. Moreover, the two symmetrically formed annular segments are further preferably positioned directly opposite to each other. Simply put, the two contact members 54 are preferably two annular segments that are symmetrically formed and directly opposed to each other. In addition, the two annular segments each comprise a bottom surface 58 having a lower inner edge 56 and a lower outer edge 57. Specifically, the lower inner edge 56 is disposed adjacent the rotating cutter body 22, whereas the lower outer edge 58 is disposed generally opposite to the lower inner edge 56 away from the rotating cutter body 22. As will be discussed in more detail below, the bottom surface 58 is designed to support the countersink cage 10 upon a convex curved surface and a concave curved surface via its lower inner edge 56 and the lower outer edge 57, respectively.

Referring more particularly to FIGS. 4–6C, the countersink cage 10 of the present invention is operative to control the countersink cutter 12 to penetrate through the curved surface 16 along a cutting axis 32 to the predetermined depth 14 and diameter 15. However, prior to such drilling and countersinking operation, the countersink cage 10 should be adjusted along the cutter body 22 so as to facilitate in penetrating the curved surface 16 to the predetermined depth 14 and diameter 15. More particularly, a set block 60 having a pin 62 mounted thereon may be obtained to adjust the countersink cage 10 along the cutter body 22 (best shown in FIGS. 6A–6C). Initially, the countersink cutter 12 is placed into the countersink cage 10. The countersink cage 10 and the countersink cutter 12 are positionable on the adjusting pin 62 through the aperture 34 and pressed downward toward the set block 60 so as to ensure that the proper depth 14 is achieved. Thereafter, two adjustments screws may be used for tightening purposes. The countersink cage 10 an d the countersink cutter 12 are then removed from the set block 60 such that the drill tool/pilot 24 may be inserted through the aperture 34 to be tightened thereafter.

In operation, as the rotating cutter body 22 and the drill tool/pilot 24 collectively translate toward the curved surface 16 along the cutting axis 32, the countersink cage 10 attached to the cutter body 22 is also translated thereto. As described above, the top cage member 18 is engaged to the rotating cutter body so as to be rotated therewith. However, the bottom cage member 20 is maintained in a stationary position as the top cage member 18 rotates thereabout. When the drill tool/pilot 24 first enters the curved surface 16 as the rotating cutter body 22 is operative to further penetrate thereafter so as the collectively reach the predetermined depth 14, the two directly opposed, symmetrically formed annular members 54 are designed to contact the curved surface 16, whether it is convexly or concavely curved. Because the two annular members are directly opposed to each other, and further being symmetrically formed, it may readily and sizeably rest upon both the convex and concave curved surfaces in a stable manner so as to increase precision and accuracy. More specifically, the lower inner edges 56 of the two annular segments are designed and adapted to support the countersink cage 10 upon a convex curved surface when the rotating cutter body 22 and the drill tool 24 reaches the predetermined depth 14 (best shown in FIG. 4). Similarly, the bottom portion 58 of the two annular segments are fit to support the countersink cage 10 upon a concave curved surface when the rotating cutter body 22 and the drill tool 24 reaches the predetermined depth (best shown in FIG. 5). By doing so, the countersink cage 10 of the present invention is designed to be operative to adaptably contact either the curved surface (e.g., convex or concave) or the flat surface in order to hinder the countersink cutter 12 and the drill tool 24 from penetrating any further than the predetermined depth 14.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A countersink cage for controlling a countersink cutter to penetrate to a predetermined depth through a curved surface along a cutting axis, the countersink cutter having a rotating cutter body, the countersink cage comprising:

a top cage member having a top aperture formed for receiving the rotating cutter body axially therethrough, the top cage member being selectively engageable to the countersink cutter along the rotating cutter body;

a bottom cage member rotatably engaged to and axially fixed to the top cage member, the bottom cage member having a bottom aperture in alignment with the top aperture for receiving the rotating cutter body axially therethrough; and two contact members extending from the bottom cage member sized and configured to contact the curved surface when the rotating cutter body penetrates therethrough along the cutting axis to the predetermined depth.

2. The countersink cage of claim 1 wherein the top and bottom cage members are each fabricated from a metallic material.

3. The countersink cage of claim 1 further comprises a dowel pin extending between the bottom cage member and a fixed location for maintaining the bottom cage member in a stationary position as the top cage member is rotatable with respect thereto.

4. The countersink cage of claim 1 wherein the top cage member has a lower top cage member portion peripherally defining a groove and the bottom cage member has an upper bottom cage member end peripherally defining an appendage extending generally perpendicular toward the rotating cutter body, the groove being complimentary to the appendage so as to be engageable with each other.

5. The countersink cage of claim 1 wherein the top cage member and the bottom cage member collectively form a raceway therebetween, the raceway having a plurality of bearing balls for facilitating the rotational engagement between the top cage member and the bottom cage member.

6. The countersink cage of claim 1 wherein the two contact members are fabricated from a metallic material.

7. The countersink cage of claim 1 wherein the two contact members are two annular segments.

8. The countersink cage of claim 7 wherein the two annular segments are directly opposed to each other.

9. The countersink cage of claim 7 wherein the two annular segments are symmetrically formed.

10. A countersink cage for controlling a countersink cutter to penetrate to a predetermined depth through a curved surface along a cutting axis, the countersink cutter having a rotating cutter body, the countersink cage comprising:

a top cage member having a top aperture formed for receiving the rotating cutter body axially therethrough, the top cage member being selectively engageable to the countersink cutter along the rotating cutter body;

a bottom cage member rotatably engaged with the top cage member, the bottom cage member having a bottom aperture in alignment with the top aperture for receiving the rotating cutter body axially therethrough and having a lower bottom cage member end; and two contact members being formed on the lower bottom cage member end extending from the bottom cage member sized and configured to contact the curved surface when the rotating cutter body penetrates therethrough along the cutting axis to the predetermined depth.

11. A countersink cage for controlling a countersink cutter to penetrate to a predetermined depth through a curved surface along a cutting axis, the countersink cutter having a rotating cutter body, the countersink cage comprising:

a top cage member having a top aperture formed for receiving the rotating cutter body axially therethrough, the top cage member being selectively engageable to the countersink cutter along the rotating cutter body;

a bottom cage member rotateably engaged with the top cage member, the bottom cage member having a bottom aperture in alignment with the top aperture for receiving the rotating cutter body axially therethrough; and two annular segments extending from the bottom cage member sized and configured to contact the curved surface when the rotating cutter body penetrates therethrough along the cutting axis to the predetermined depth, each annular segment having a lower inner edge and a bottom surface, the lower inner edge being disposed adjacent the rotating cutter body for supporting the countersink cage upon a convex curved surface, the bottom surface being configured for supporting the countersink cage upon a concave curved surface.

12. A drill and countersink device for penetrating to a predetermined depth through a curved surface along a cutting axis, the device comprising:

a countersink cutter having a cutter body, the cutter body having a device end and a cutting end, the device end being engaged to the drill and countersink device for rotating the cutter body thereby, the cutting end being operative to penetrate through the curved surface along the cutting axis to the predetermined depth; and a countersink cage for controlling the countersink cutter to penetrate to the predetermined depth, the countersink cage comprising:

a top cage member having a top aperture formed for receiving the cutter body axially therethrough, the top cage member being selectively engageable to the cutter body between the device and cutting ends;

a bottom cage member rotatably engaged to and axially fixed to the top cage member, the bottom cage member having a bottom aperture in alignment with the top aperture for receiving the cutter body axially therethrough; and two contact members extending from the bottom cage member sized and configured to contact the curved surface when the cutting end of the cutter body penetrates therethrough along the cutting axis to the predetermined depth.

13. The device of claim 12 further comprises a dowel pin extending between the bottom cage member and a fixed location of the drill and countersink device for maintaining the bottom cage member in a stationary position as the top cage member is rotatable with respect thereto.

14. The device of claim 12 wherein the top cage member has a lower top cage member portion peripherally defining a groove and the bottom cage member has an upper bottom cage member end peripherally defining an appendage extending generally perpendicular toward the cutter body, the groove being complimentary to the appendage so as to be engageable with each other.

15. The device of claim 12 wherein the top cage member and the bottom cage member collectively form a raceway therebetween, the raceway having a plurality of bearing balls for facilitating the rotational engagement between the top cage member and the bottom cage member.

16. The device of claim 12 wherein the bottom cage member has a lower bottom cage member end, the two contact members being formed on the lower bottom cage member end.

17. The device of claim 12 wherein the two contact members are two annular segments.

18. The device of claim 17 wherein the two annular segments are directly opposed to each other.

19. The device of claim 17 wherein the two annular segments are symmetrically formed.

20. A drill and countersink device for penetrating to a predetermined depth through a curved surface along a cutting axis, the device comprising:

a countersink cutter having a cutter body, the cutter body having a device end and a cutting end, the device end being engaged to the drill and countersink device for rotating the cutter body thereby, the cutting end being operative to penetrate through the curved surface along the cutting axis to the predetermined depth; and a countersink cage for controlling the countersink cutter to penetrate to the predetermined depth, the countersink cage comprising:

a top cage member having a top aperture formed for receiving the cutter body axially therethrough, the top cage member being selectively engageable to the cutter body between the device and cutting ends;

a bottom cage member rotatably engaged with the top cage member, the bottom cage member having a bottom aperture in alignment with the top aperture for receiving the cutter body axially therethrough; and two annular segments directly opposed to each other extending from the bottom cage member sized and configured to contact the curved surface when the cutting end of the cutter body penetrates therethrough along the cutting axis to the predetermined depth, each annular segment having a lower inner edge and a bottom portion, the lower inner edge being disposed adjacent the cutter body for supporting the countersink cage upon a convex curved surface, the bottom portion being configured for supporting the countersink cage upon a concave curved surface.

21. A method of penetrating a curved surface to a predetermined depth along a cutting axis with a countersink cutter, the countersink cutter having a rotating cutter body, the method comprising the steps of:

a) engaging a countersink cage having two annular segments to the countersink cutter along the rotating cutter body;

b) penetrating the curved surface with the rotating cutter body along the cutting axis; and c) stopping the rotation of the cage to indicate that the rotating cutter body has penetrated the surface to the predetermined depth.

22. The method of claim 21 wherein step a) comprises:
1) defining a top cage member with a top aperture and a bottom cage member with a bottom aperture;
2) aligning the top and bottom apertures to each other;
3) receiving the rotating cutter body axially through the top and bottom apertures; and
4) adjusting the countersink cage along the rotating cutter body so as to facilitate in penetrating the curved surface to the predetermined depth.

23. The method of claim 22 wherein step 1) comprises:
i) rotatably engaging the top cage member with the bottom cage member; and
ii) securing the bottom cage member in a stationary position as the top cage member is rotatable with respect thereto.

24. The method of claim 23 wherein step ii) comprises:
(a) defining a drill and countersink device having a fixed location; and
(b) extending a dowel pin between the bottom cage member and the fixed location of the drill and countersink device.

25. A method of penetrating a curved surface to a predetermined depth along a cutting axis with a countersink cutter, the countersink cutter having a rotating cutter body, the method comprises:
a) engaging a countersink cage having two annular segments to the countersink cutter along the rotating cutter body, the engaging step comprising the steps of:
1) defining a top cage member with a top aperture and a bottom cage member with a bottom aperture;
2) aligning the top and bottom apertures to each other;
3) receiving the rotating cutter body axially through the top and bottom apertures; and
4) adjusting the countersink cage along the rotating cutter body so as to facilitate in penetrating the curved surface to the predetermined depth, the adjusting step comprising the steps of:
i) obtaining a set block having a pin mounted thereon;
ii) positioning the countersink cage on the pin through the top aperture;
iii) partially pushing the rotating cutter body with the pin;
iv) removing the countersink cage from the set block;
v) engaging a drill tool to the rotating cutter body; and
vi) engaging the top cage member to the rotating cutter body.
b) penetrating the curved surface with the rotating cutter body along the cutting axis; and
c) contacting the curved surface with the two annular segments when the rotating cutter body penetrates therethrough to the predetermined depth.

26. The method of claim 21 wherein step b) comprises:
1) defining a drill and countersink device; and
2) engaging the rotating cutter body to the drill and countersink device.

27. The method of claim 21 wherein the two annular segments are directly opposed to each other.

28. The method of claim 21 wherein the two annular segments are symmetrically formed.

29. A method of penetrating a curved surface to a predetermined depth along a cutting axis with a countersink cutter, the countersink cutter having a rotating cutter body, the method comprises:
a) engaging a countersink cage having two annular segments to the countersink cutter along the rotating cutter body;
b) penetrating the curved surface with the rotating cutter body along the cutting axis; and
c) contacting the curved surface with the two annular segments when the rotating cutter body penetrates therethrough to the predetermined depth, the contacting step further comprising the steps of:
1) defining a lower inner edge and a lower outer edge of the two annular segments, the lower inner edge being disposed adjacent the rotating cutter body, the lower outer edge being disposed opposite to the lower inner edge away from the rotating cutter body; and
2) contacting a convex curved surface with the lower inner edge when the rotating cutter body penetrates therethrough to the predetermined cutting depth.

30. A method of penetrating a curved surface to a predetermined depth along a cutting axis with a countersink cutter, the countersink cutter having a rotating cutter body, the method comprising the steps of:
a) engaging a countersink cage having two annular segments to the countersink cutter along the rotating cutter body;
b) penetrating the curved surface with the rotating cutter body along the cutting axis; and
c) contacting the curved surface with the two annular segments when the rotating cutter body penetrates therethrough to the predetermined depth, the contacting step further comprising the steps of:
1) defining a lower inner edge and a lower outer edge of the two annular segments, the lower inner edge being disposed adjacent the rotating cutter body, the lower outer edge being disposed opposite to the lower inner edge away from the rotating cutter body; and
2) contacting a concave curved surface with the bottom portion when the rotating cutter body penetrates therethrough to the predetermined cutting depth.

31. A cage for controlling a cutter to penetrate to a predetermined depth through a surface, the cage comprising:
a cage having an aperture formed therethrough for receiving a rotating cutter body, the rotating cutter body being independently rotateable within the cage and axially fixed to the cage; and
at least two contact members extending from the cage, each contact member defining a lower inner and outer edge to control a penetration of the rotating cutter body to a predetermined depth through a concave and a convex curved surface, the lower inner edge being disposed adjacent the rotating cutter body for supporting the cage upon a convex curved surface, the lower outer edge being disposed adjacent the lower inner edge for supporting the cage upon a concave curved surface.

32. The cage of claim 31 wherein the lower inner and outer edge define a single lower edge disposed adjacent the rotating cutter body for supporting the cage upon a convex and concave surface.

* * * * *